Jan 6, 1931.  P. A. TOMES  1,787,962
REVERSIBLE CARTRIDGE FOR PLASTIC MATERIAL
Original Filed March 31, 1927
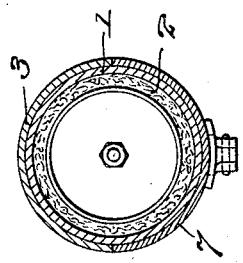
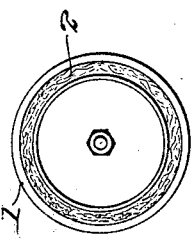
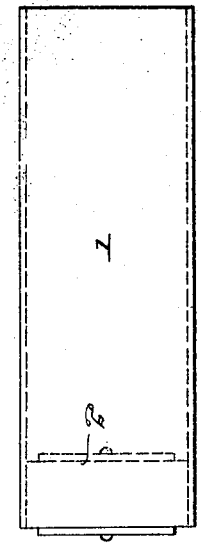
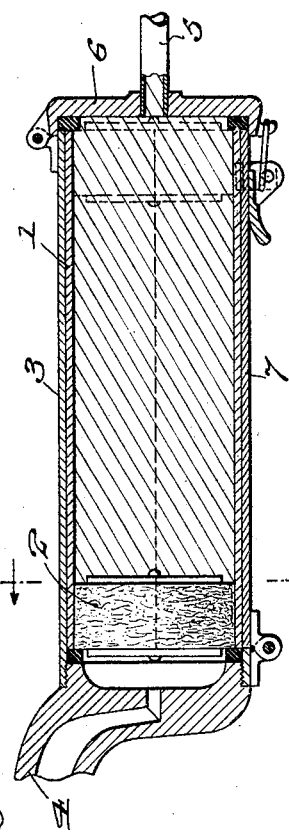
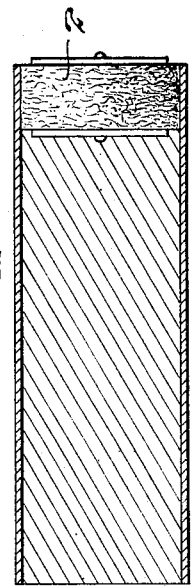
INVENTOR
BY
ATTORNEYS Patented Jan. 6, 1931

1,787,962

UNITED STATES PATENT OFFICE

PERCY AUSTEN TOMES, OF BROOKLYN, NEW YORK

REVERSIBLE CARTRIDGE FOR PLASTIC MATERIAL

Original application filed March 31, 1927, Serial No. 179,900. Divided and this application filed February 14, 1929. Serial No. 339,908.

The object of my invention is to provide a reversible cartridge for use in guns for ejecting plastic material, said cartridge including an open ended tube of sheet metal or other suitable durable material, and a free plunger therein adapted to be moved from end to end of the tube in either direction for ejecting the plastic material, so that when the plastic material has been ejected from the tube through one end thereof by the advance movement of the free plunger, the free plunger may be left in its so advanced position, the tube removed from the gun and refilled with plastic material through its other end. The tube is then reversed and inserted into the gun and the plastic material ejected through the last named end by the movement of the free plunger toward the said end.

A practical embodiment of my invention is represented in the accompanying drawings, in which Fig. 1 represents a side elevation of the cartridge with the free plunger located at one end thereof;

Fig. 2 represents a longitudinal central section through the cartridge with the free plunger at the other end thereof;

Fig. 3 represents an end view of the cartridge;

Fig. 4 represents a detail longitudinal central section through a fluid pressure gun for ejecting plastic material from the cartridge, the free plunger being shown in full lines at one end of the cartridge and in dotted lines at the other end of the cartridge, and Fig. 5 represents a cross section taken in the plane of the line V—V of Fig. 4.

The cartridge 1 for containing the plastic material comprises a tube open at both ends, which tube is made of some suitable rigid and durable material, such, for instance, as thin sheet metal. A free plunger 2 of suitable material, such, for instance, as felt is located within the tube and is fitted to be moved by pressure from end to end of the tube to eject the plastic material therefrom through either end. The fluid pressure operated gun, a portion of which is illustrated in the accompanying drawings, comprises, generally, the barrel 3, the handle 4 and the nozzle 5. The nozzle 5 is carried by a swinging head 6 and the barrel 3 is provided with a laterally swinging hinged member 7 for permitting the insertion and removal of the cartridge.

In use, the free plunger 2 is located at one end of the tube and the tube is filled with plastic material through its other end. The cartridge is then placed in the gun and the plastic material is ejected through the open end of the tube by the advance movement of the free plunger 2. After the plastic material has been ejected from the tube, the cartridge is removed from the gun and is refilled with plastic material through its other end and the cartridge reversed and again inserted into the gun where the advance movement of the free plunger will eject the plastic material through the said last named end.

From the above description it will be seen that I have provided a cartridge suitable for repeated use, it being understood that after the free plunger has been moved to one end of the cartridge it will not have to be disturbed while the cartridge is being refilled, the mere reversal of the cartridge bringing it into use.

The parts of the gun shown and described, but not claimed herein, form the subject matter of my copending application filed March 31st, 1927, Serial No. 179,900, of which this application is a division.

What I claim is:—

1. A reversible cartridge for use in guns for ejecting plastic material, said cartridge comprising an open ended closed sided tube for containing the plastic material and a free plunger arranged to be moved from end to end of the tube in either direction for ejecting the plastic material therefrom, so that when the plastic material has been ejected through one end of the tube the plunger may be left in its advance position, the tube removed from the gun and refilled through its other end.

2. A reversible cartridge for use in guns for ejecting plastic material, said cartridge comprising an open ended closed sided tube of rigid and permanent material for containing the plastic material and a free plunger arranged to be moved from end to end of the tube in either direction for ejecting the plastic material therefrom, so that when the plastic material has been ejected through one end of the tube the plunger may be left in its advance position, the tube removed from the gun and refilled through its other end.

3. A reversible cartridge for use in guns for ejecting plastic material, said cartridge comprising an open ended closed sided tube of thin sheet metal for containing the plastic material and a free plunger arranged to be moved from end to end of the tube in either direction for ejecting the plastic material therefrom, so that when the plastic material has been ejected through one end of the tube the plunger may be left in its advance position, the tube removed from the gun and refilled through its other end.

In testimony that I claim the foregoing as my invention, I have signed my name this 12 day of February, 1929.

PERCY AUSTEN TOMES.